United States Patent
Wu et al.

(10) Patent No.: US 7,397,785 B2
(45) Date of Patent: Jul. 8, 2008

(54) METHOD FOR ENHANCING FAIRNESS AND PERFORMANCE IN A MULTIHOP AD HOC NETWORK AND CORRESPONDING SYSTEM

(75) Inventors: Haitao Wu, Beijing (CN); Liang Sun, Beijing (CN); Shiduan Cheng, Beijing (CN); Jian J. Ma, Beijing (CN)

(73) Assignee: Nokia Corporation, Espoo (FI)

( * ) Notice: Subject to any disclaimer, the term of this patent is extended or adjusted under 35 U.S.C. 154(b) by 745 days.

(21) Appl. No.: 10/713,430

(22) Filed: Nov. 17, 2003

(65) Prior Publication Data

US 2004/0240426 A1 Dec. 2, 2004

(30) Foreign Application Priority Data

May 28, 2003 (EP) .................................. 03012047

(51) Int. Cl.
*H04J 3/06* (2006.01)
(52) U.S. Cl. ................ 370/350; 370/310; 370/314; 370/319; 370/320; 370/321; 370/324; 370/329; 370/338; 455/41.2; 455/41.3; 455/435.1
(58) Field of Classification Search ................ 370/312, 370/310, 314, 319–321, 324, 329, 338; 455/41.2, 455/41.3, 435.1, 435.2, 435.3
See application file for complete search history.

(56) References Cited

U.S. PATENT DOCUMENTS

| | | | |
|---|---|---|---|
| 5,721,725 A | | 2/1998 | Want et al. |
| 5,732,077 A | * | 3/1998 | Whitehead .................. 370/349 |
| 5,884,171 A | * | 3/1999 | Tanabe et al. ............... 455/434 |
| 7,054,296 B1 | * | 5/2006 | Sorrells et al. .............. 370/338 |
| 7,054,329 B2 | * | 5/2006 | Cervello et al. ............. 370/447 |
| 7,130,289 B2 | * | 10/2006 | Kuan et al. .................. 370/338 |
| 2002/0027894 A1 | | 3/2002 | Leppa et al. |
| 2002/0172186 A1 | | 11/2002 | Larsson |
| 2002/0191573 A1 | | 12/2002 | White et al. |
| 2003/0033394 A1 | | 2/2003 | Stine |

(Continued)

FOREIGN PATENT DOCUMENTS

CA 2 412 038 5/2003

(Continued)

OTHER PUBLICATIONS

Z. J. Haas et al. "DBTMA—A Mac control scheme for ad hoc networks" IEEE Trans On Comm, V50, N6, Jun. 2002, p. 975-985.*

(Continued)

*Primary Examiner*—Steve M. D'Agosta
(74) *Attorney, Agent, or Firm*—Squire, Sanders & Dempsey, L.L.P.

(57) ABSTRACT

A method for enhancing the fairness and performance in a multihop ad hoc network, the method usually including providing contention synchronization information regarding a transmission between nodes of the network, wherein the information is routinely provided to nodes in a range of two hops from the nodes participating at the transmission. The method also typically includes setting, after successfully finishing the transmission, a waiting time for the nodes participating at the transmission, in which these nodes backoff from accessing a transmission medium.

12 Claims, 1 Drawing Sheet

(a)

(b)

U.S. PATENT DOCUMENTS

2003/0095504 A1    5/2003    Ogier

FOREIGN PATENT DOCUMENTS

| EP | 0 680 177 | 11/1995 |
|----|-----------|---------|
| WO | WO 02/028020 | 4/2002 |
| WO | WO 03/026218 | 3/2003 |
| WO | WO 03/026221 | 3/2003 |

OTHER PUBLICATIONS

S. Xu, T. Saadawi, "Does the IEEE 802.11 MAC Protocol Work Well in Multihop Wireless Ad Hoc Networks?," IEEE Communication Magazine, Jun. 2001. I.*

B.P. Crow, I. Widjaja, J.G. Kim, P.T. Sakai, "IEEE 802.11 Wireless Local Area Networks," IEEE Communications Magazine, Sep. 1997.

Z.J. Haas, J. Deng, "Dual Busy Tone Multiple Access (DBTMA)—A Multiple Access Control Scheme for Ad Hoc Networks," IEEE Trans. On Comm. V50, N6, Jun. 2002, p. 975-985.

K. Chandran, S. Raghunathan, S. Venkatesan, R. Prakash, "A Feedback-Based Scheme for Improving TCP Performance in Ad Hoc Wireless Networks," IEEE Personal Comm., Feb. 2001, p. 34-39.

F. Wang, Y. Zhang, "Improving TCP Performance Over Mobile Ad-Hoc Networks With Out-Of-Order Detection and Response," MOBIHOC '02, Jun. 2002.

C. Bakarat, E. Altman, W. Dabbous, "On TCP Performance in a Heterogeneous Network: A Survey," IEEE Commun. Mag., Jan. 2000.

S. Xu, T. Saadawi, "Does the IEEE 802.11 MAC Protocol Work Well in Multihop Wireless Ad Hoc Networks?," IEEE Commun. Mag, Jun. 2001.

V. Bharghavan, A. Demers, S. Shenker, L. Zhang, MACAW: A Media Access Protocol for Wireless WLAN's, ACM SIGCOMM, 1994, p. 212-225.

C.L. Fulmer, J.J. Garcia-Luna-Aceves, "Floor Acquisition Multiple Access (FAMA) for Packet-Radio Networks," ACM SIGCOMM 1995.

C.L. Fulmer, J.J. Garcia-Luna Aceves, "Solutions to Hidden Terminal Problems in Wireless Networks," ACM SIGCOMM 1997.

T. Ozugur, M. Naghshineh, P. Kermani, J.A. Copeland, "Fair Media Access for Wireless LANs," IEEE Globecomm '99, p. 570-579, 1999.

Z. Fang, B. Bensaou, Y. Wang, "Performance Evaluation of a Fair Backoff Algorithm for IEEE 802.11 DFWMAC," MOBIHOC '02, Jun. 2002.

X.L. Huang, B. Bensaou, "On Max-min Fairness and Scheduling in Wireless Ad-Hoc Networks: Analytical Framework and Implementation," MOBIHOC '01, Long Beach, CA 2001.

T. Nandagopal, T-E Kim, X. Gao, V. Bharghavan, "Achieving MAC Layer Fairness in Wireless Packet Networks," ACM MOBICOM 2000.

V. Kanodia, C. Li, A. Sabharwal, B. Sadeghi, E. Knightly, "Distributed Multi-Hop Scheduling and Medium Access with Delay and Throughput Contraints," ACM SIGMOBILE 2001, p. 200-209.

V. Kanodia, C. Li, A. Sabharwal, B. Sadeghi, E. Knightly, "Ordered Packet Scheduling in Wireless Ad Hoc Networks: Mechanisms and Performance Analysis," MOBIHOC '02, Jun. 2002.

C.E. Koksai, H. Kassab, H. Balakrishnan, "An Analysis of Short-Term Fairness in Wireless Media Access Protocols," ACM SIGNMETRICS 2000.

"NS", URL http://www-mash.cs.berkeley.edu/ns/, Aug. 4, 2003.

Anon: "Wireless LANs - MAC layer", CS 117, Feb. 4, 2003 pp. 1-34.

Rowland, Daniel, "Performance Improvement Schemes for Wireless Data Links", ECPE 6504 - Spring, 2000, Apr. 24, 2000, pp. 1-20.

Mangharam, Rahul, "Delay Constrained MAC Protocols for Wireless LANs", Anon, Dec. 5, 2000, pp. 1-17.

* cited by examiner

METHOD FOR ENHANCING FAIRNESS AND PERFORMANCE IN A MULTIHOP AD HOC NETWORK AND CORRESPONDING SYSTEM

BACKGROUND OF THE INVENTION

1. Field of the Invention

Certain embodiments of the present invention relate generally to a method for enhancing the fairness and/or performance in a multihop ad hoc network as well as to a corresponding system therefor, and/or to network nodes of the system executing steps of the method.

2. Description of the Related Art

A wireless ad hoc network is commonly a network where nodes may not communicate with each other directly as in Wireless Local Area Networks (WLAN) and usually may use multihop wireless links. Each node in an ad hoc network generally not only sends packets from itself, but also typically forwards packets for other nodes, thus normally acting as a router. Generally, an ad hoc network is self-organized and includes nodes that support an ad hoc routing protocol, such as, for example, Dynamic Source Routing (DSR), Dynamic Sequence Distance Vector (DSDV), etc.

Contrary to an ad hoc network, Wireless Local Area Networks are typically developed to provide high bandwidth access for users in a limited geographical area, where nodes may usually communicate with each other directly. The IEEE Project 802 recommends an international standard 802.11 for Wireless Local Area Networks (see "IEEE standard for Wireless LAN Medium Access Control (MAC) and Physical Layer (PHY) specifications", ISO/IEC 8802-11:1999(E), Aug. 1999; and B. P. Crow, J. G. Kim: "IEEE 802.11 Wireless Local Area Networks", IEEE Communications magazine, Sept. 1997). With the Distributed Coordination Function (DCF) according to the 802.11 standard, a four-way handshaking mechanism, which uses request-to-send/clear-to-send (RTS/CTS) technique to reserve the channel before data transmission, is proposed to solve the problem of hidden terminals. Although the collision probability for hidden terminals is thus commonly reduced, it generally does not solve the problem completely.

Specifically, the details of the distributed Coordination Function are as follows. The DCF is the fundamental access method used to support asynchronous data transfer on a best effort basis. That is, all stations must support the DCF. The DCF operates solely in the ad hoc network, and either operates solely or coexists with a point coordination function (PCF) in an infrastructure network. According to the MAC architecture, the DCF sits directly on top of the physical layer and supports contention services. Contention services imply that each station with a frame body queued for transmission must contend for access to the channel and, once the frame body is transmitted, must recontend for access to the channel for all subsequent frames. Contention services promote fair access to the channel for all stations.

The DCF is based on carrier sense multiple access with collision avoidance (CSMA/CA). CSMA/CD (collision detection) is not used because a station is unable to listen to the channel for collisions while transmitting. In IEEE 802.11, carrier sensing is performed at both the air interface, referred to as physical carrier sensing, and at the MAC sublayer, referred to as virtual carrier sensing. Physical carrier sensing detects the presence of other IEEE 802.11 WLAN users by analyzing all detected packets, and also detects activity in the channel via relative signal strength from other sources.

A source station performs virtual carrier sensing by sending MPDU (MAC protocol data unit) duration information in the header of request to send (RTS), clear to send (CTS), and data frames. An MPDU is a complete data unit that is passed from the MAC sublayer to the physical layer. The MPDU contains header information, payload, and a 32-bit CRC. The duration field indicates the amount of time (in microseconds) after the end of the present frame the channel will be utilized to complete the successful transmission of the data or management frame. Stations in the BSS use the information in the duration field to adjust their network allocation vector (NAV), which indicates the amount of time that must elapse until the current transmission session is complete and the channel can be sampled again for idle status. The channel is marked busy if either the physical or virtual carrier sensing mechanisms indicate the channel is busy.

Priority access to the wireless medium is controlled through the use of interframe space (IFS) time intervals between the transmission of frames. The IFS intervals are mandatory periods of idle time on the transmission medium. Three IFS intervals are specified in the standard: short IFS (SIFS), point coordination function IFS (PIFS), and DCF-IFS (DIFS). The SIFS interval is the smallest IFS, followed by PIFS and DIFS, respectively. Stations only required to wait a SIFS have priority access over those stations required to wait a PIFS or DIFS before transmitting; therefore, SIFS has the highest-priority access to the communications medium. For the basic access method, when a station senses the channel is idle, the station waits for a DIFS period and samples the channel again. If the channel is still idle, the station transmits an MPDU. The receiving station calculates the checksum and determines whether the packet was received correctly. Upon receipt of a correct packet, the receiving station waits a SIFS interval and transmits a positive acknowledgment frame (ACK) back to the source station, indicating that the transmission was successful. When the data frame is transmitted, the duration field of the frame is used to let all stations in the BSS know how long the medium will be busy. All stations hearing the data frame adjust their NAV based on the duration field value, which includes the SIFS interval and the ACK following the data frame.

Since a source station in a BSS cannot hear its own transmissions, when a collision occurs, the source continues transmitting the complete MPDU. If the MPDU is large (e.g., 2300 octets), a lot of channel bandwidth is wasted due to a corrupt MPDU. RTS and CTS control frames can be used by a station to reserve channel bandwidth prior to the transmission of an MPDU and to minimize the amount of bandwidth wasted when collisions occur. RTS and CTS control frames are relatively small (RTS is 20 octets and CTS is 14 octets) when compared to the maximum data frame size (2346 octets). The RTS control frame is first transmitted by the source station (after successfully contending for the channel) with a data or management frame queued for transmission to a specified destination station. All stations in the BSS, hearing the RTS packet, read the duration field and set their NAVs accordingly. The destination station responds to the RTS packet with a CTS packet after an SIFS idle period has elapsed. Stations hearing the CTS packet look at the duration field and again update their NAV. Upon successful reception of the CTS, the source station is virtually assured that the medium is stable and reserved for successful transmission of the MPDU. Note that stations are capable of updating their NAVs based on the RTS from the source station and CTS from the destination station, which helps to combat the "hidden terminal" problem. In the transmission of an MPDU using the RTS/CTS mechanism, stations can choose to never use RTS/CTS, use RTS/CTS whenever the MSDU exceeds the value of RTS_Threshold (manageable parameter), or always use RTS/

CTS. If a collision occurs with an RTS or CTS MPDU, far less bandwidth is wasted when compared to a large data MPDU. However, for a lightly loaded medium, additional delay is imposed by the overhead of the RTS/CTS frames.

Large MSDUs handed down from the LLC to the MAC may require fragmentation to increase transmission reliability. To determine whether to perform fragmentation, MPDUs are compared to the manageable parameter Fragmentation_Threshold. If the MPDU size exceeds the value of Fragmentation_Threshold, the MSDU is broken into multiple fragments. The resulting MPDUs are of size Fragmentation_Threshold, with exception of the last MPDU, which is of variable size not to exceed Fragmentation_Threshold. When an MSDU is fragmented, all fragments are transmitted sequentially. The channel is not released until the complete MSDU has been transmitted successfully, or the source station fails to receive an acknowledgment for a transmitted fragment. The destination station positively acknowledges each successfully received fragment by sending a DCF ACK back to the source station. The source station maintains control of the channel throughout the transmission of the MSDU by waiting only an SIFS period after receiving an ACK and transmitting the next fragment. When an ACK is not received for a previously transmitted frame, the source station halts transmission and recontends for the channel. Upon gaining access to the channel, the source starts transmitting with the last unacknowledged fragment.

If RTS and CTS are used, only the first fragment is sent using the handshaking mechanism. The duration value of RTS and CTS only accounts for the transmission of the first fragment through the receipt of its ACK. Stations in the BSS thereafter maintain their NAV by extracting the duration information from all subsequent fragments.

The collision avoidance portion of CSMA/CA is performed through a random backoff procedure. If a station with a frame to transmit initially senses the channel to be busy; then the station waits until the channel becomes idle for a DIFS period, and then computes a random backoff time. For IEEE 802.11, time is slotted in time periods that correspond to a Slot_Time. Unlike slotted Aloha, where the slot time is equal to the transmission time of one packet, the Slot_Time used in IEEE 802.11 is much smaller than an MPDU and is used to define the IFS intervals and determine the backoff time for stations in the CP. The Slot_Time is different for each physical layer implementation. The random backoff time is an integer value that corresponds to a number of time slots. Initially, the station computes a backoff time in the range 0-7. After the medium becomes idle after a DIFS period, stations decrement their backoff timer until the medium becomes busy again or the timer reaches zero. If the timer has not reached zero and the medium becomes busy, the station freezes its timer. When the timer is finally decremented to zero, the station transmits its frame. If two or more stations decrement to zero at the same time, a collision will occur, and each station will have to generate a new backoff time in the range 0-15. For each retransmission attempt, the backoff time grows as $\lfloor 2^{2+i} \cdot \mathrm{ranf}(\ ) \rfloor \cdot \mathrm{Slot\_Time}$, where i is the number of consecutive times a station attempts to send an MPDU, ranf( ) is a uniform random variate in (0,1), and $\lfloor x \rfloor$ represents the largest integer less than or equal to x. The idle period after a DIFS period is referred to as the contention window (CW). The advantage of this channel access method is that it promotes fairness among stations, but its weakness is that it probably could not support DTBS. Fairness is maintained because each station must recontend for the channel after every transmission of an MSDU. All stations have equal probability of gaining access to the channel after each DIFS interval. Time-bounded services typically support applications such as packetized voice or video that must be maintained with a specified minimum delay. With DCF, there is no mechanism to guarantee minimum delay to stations supporting time-bounded services.

However, since the Distributed Coordination Function (DCF) is typically designed to work in the Wireless Local Area Network (WLAN) situation with hidden terminals, it usually does not work well in multihop ad hoc networks. Further, since the Distributed Coordination Function is normally based on Carrier Sense Multiple Access with Collision Avoidance (CSMA/CA), the sender will generally sense whether the channel is busy before a transmission is initiated. Typically, only when the channel is idle, the sender will transmit the packet, otherwise it will usually backoff a random time, which is commonly determined by the contention window (CW) value. This mechanism generally works well in the Wireless Local Area Network (WLAN) scenario. However, in a multihop ad hoc network, packet collisions may occur at the receiver. Therefore, sensing the channel at the transmitter before any attempt to access the channel typically cannot eliminate such collisions. Hence, in multihop scenario, the sender usually does not know the situation of the receiver and/or risks for collisions at the receiver.

The hidden terminal problem may often be reduced by at least two ways: Firstly, using a slotted based synchronization mechanism with proper collision avoidance, and secondly, using another channel (see Z. J. Hass, J. Deng: "Dual Busy Tone Multiple Access (DBTMA)—A Multiple Access Control Scheme for Ad Hoc Networks", IEEE Trans. On Comm. V50, N6, June 2002, pp.975-985) to acknowledge the data packet and/or prevent a possible access attempt in the receiver range, and the sender must generally make sure that the acknowledgment channel is idle before transmission.

However, an ad hoc network is typically supposed to be self-organized. Currently, however, there is no known standard to synchronize all the packet transmitting times. Meanwhile, the hardware implementation cost of a two or more channel protocol is usually unknown, although most of them use only narrow-bandwidth, out-of-band busy tone. Therefore, a distributed Medium Access Control (MAC) protocol for one channel without specific synchronization slot mechanism is normally preferred. However, it is generally a challenging undertaking to design such a distributed single channel Medium Access Control (MAC) protocol for a multihop network.

On the other hand, there is no known scheme in the Distributed Coordination Function (DCF) to deal with the problem of exposed terminals. According to the Distributed Coordination Function (DCF), the Medium Access Control (MAC) layer ACK is typically used to improve the performance of the Medium Access Control (MAC) protocol in transmission errors. Therefore, the sender usually becomes the receiver of the Medium Access Control (MAC) acknowledgment (ACK) after it has transmitted the data packet. With a single channel, the exposed terminal problem is normally difficult to solve.

From the viewpoint of customers or users, the performance of the transport layer is commonly the most important consideration, regardless of whether it runs over a Local Area Network (LAN), a Wireless Local Area Network (WLAN), or a mobile ad hoc network (MANET). The Transport Control Protocol (TCP) is the most widely used reliable transport layer protocol and is often expected to work well in ad hoc networks (see, for example, K. Chandran, S. Raghunathan, et al.: "A Feedback-Based Scheme for Improving TCP Performance in Ad Hoc Wireless Networks", IEEE Personal Comm., Feb. 2001, pp.34-39; F. Wang, Y. Zhang: "Improving TCP Performance over Mobile Ad-Hoc Networks with Out-of-Order Detection and Response", MOBIHOC'02, June 2002; C. Barakat, E. Altman, W. Dabbous: "On TCP Performance in a Heterogeneous Network: A Survey", IEEE Commun. Mag., Jan. 2000; and S. Xu, T. Saadawi: "Does the IEEE 802.11 MAC Protocol Work Well in Multihop Wireless Ad hoc Network", IEEE Commun. Mag., June 2001). How to improve the TCP performance in multihop ad hoc networks (MANET) with frequent link failures and route changes due to node mobility is the focus of recent work. Most of them require a feedback from the network layer or lower layer to change the status of TCP. According to K. Chandran, S. Raghunathan, et al.: "A Feedback-Based Scheme for Improving TCP Performance in Ad Hoc Wireless Networks", IEEE Personal Comm., Feb. 2001, pp.34-39, TCP is typically adapted to frequent route changes by detecting and/or responding an out-of-order packet delivery at the TCP layer. However, the recent study of S. Xu, T. Saadawi: "Does the IEEE 802.11 MAC Protocol Work Well in Multihop Wireless Ad hoc Network", IEEE Commun. Mag., June 2001, shows that the TCP over 802.11 DCF usually works poorly, even if there is no mobile node. The problem often lies in the Medium Access Control (MAC) protocol 802.11 DCF, where the hidden terminal problem generally still exists in a multihop ad hoc network, and where the binary exponential backoff (BEB) scheme of the Distributed Coordintaion Function (DCF) almost always favors the latest successful node.

The Medium Access Control (MAC) protocol with which stations may share a common broadcast channel is, however, typically essential in a Wireless Local Area (WLAN) and/or an ad hoc network. Thus, in order to address the above problems, the following proposals have been made during the past years.

The fairness problem was first pointed out by V. Bharghavan, A. Demers, S. Shenker, L. Zhang: "MACAW: A Media Access Protocol for Wireless WLAN's", ACM SIGCOMM, 1994, pp.212-225. That is, usually, based on a Request-to-Send/Clear-to-Send (RTS/CTS) exchange to reserve the channel before the data transmission for addressing the hidden terminals problem in single channel networks, a new protocol named MACAW generally using an RTS-CTS-DS-DATA-ACK message exchange and typically including multiple increase and linear decrease backoff strategies, has been proposed therein. The data sending (DS) packet was added, generally to notify all nodes in the sender's range of its following use of the shared channel. Although the RTS/CTS exchange usually cannot eliminate the hidden terminal problem, it commonly can alleviate it to some extent. Therefore, the IEEE 802.11 committee proposed the "IEEE standard for Wireless LAN Medium Access Control (MAC) and Physical Layer (PHY) specifications", ISO/IEC 8802-11:1999(E), Aug. 1999, which includes a RTS/CTS exchange as an optional access method. However, MACAW often uses packet sensing (PS), while the 802.11 DCF is routinely based on CSMA/CA.

Further, it has been proposed by C. L. Fullmer, J. J. Garcia-Lura-Aceves: "Floor Acquisition Multiple Access (FAMA) for Packet-Radio Networks", ACM SIGCOMM 1995, that a station that has data to send generally must acquire control of the channel before sending, and, typically, that it ensures that no data packets collide with any other packets. It was also shown that carrier sensing is usually necessary in FAMA protocols to eliminate the hidden terminal problem efficiently in single-channel networks (see C. L. Fullmer, J. J. Garcia-Lura-Aceves: "Solutions to Hidden Terminal Problems in Wireless Networks", ACM SIGCOMM 1997). However, the absence of data packet collisions normally does not mean fairness. In fact, all of these protocols generally favor the station whose corresponding receiver has no collision.

A contention resolution algorithm that combines persistence and backoff has been proposed by T. Czugur, M. Naghshineh, P. Kermani, J. A. Copeland: "Fair Media Access for Wireless LANs", IEEE Globecom'99, pp.570-579, 1999, with two variants, connection-based and time-based. It also often uses a backoff strategy and/or a copying scheme similar to MACAW. However, the results have typically shown that none of the algorithm always provides the best fair access in every scenario. Besides, there is usually no formal fairness objective in this scheme.

Still further, a measurement-based algorithm has been proposed by Z. Fang, B. Bensaou, Y. Wang: "Performance Evaluation of a Fair Backoff Algorithm for IEEE 802.11 DFW-MAC", MOBIHOC'02, June 2002, to achieve fairness in ad hoc networks, generally by replacing the binary exponential backoff (BEB) in the Distributed Control Function (DCF) with another backoff scheme where the contention windows are typically adjusted according to what the stations hears. Since it usually adjusts the contention window (CW) directly, the traffic load normally fluctuates greatly, especially on a short time scale. Although it commonly achieves at least some degree of fairness, the performance routinely degrades when the density of traffic and stations increases.

A distributed Max-Min fairness framework for wireless ad hoc network has been proposed by X. L. Huang, B. Bensaou,: "On Max-Min Fairness and Scheduling in Wireless Ad-Hoc Networks: Analytical Framework and Implementation", MOBIHOC'01, Long Beach, Calif., 2001. The Max-Min fairly shared assignment is generally achieved in a distributed way, where nodes often obtain contention tree information from all their neighbor's neighbors. The backoff window is typically adjusted according to a fairness reference, similar to the way described by Z. Fang, B. Bensaou, Y. Wang: "Performance Evaluation of a Fair Backoff Algorithm for IEEE 802.11 DFWMAC", MOBIHOC'02, June 2002. However, without synchronization information, stations usually cannot compete efficiently in a distributed way. Thus, the whole performance may degrade.

Furthermore, T. Nandagopal, T. Kim, X. Gao, V. Bharghavan: "Achieving MAC Layer Fairness in Wireless Packet Networks", ACM Mobicom 2000, proposed a general analytical framework that generally captures the unique characteristics of shared wireless channels and/or typically allows the modeling of a large class of system-wide fairness models, usually via the specification of per-flow utility functions. By combining persistence and backoff, a slotted local mechanism for proportional fair contention resolution is presented. However, how to implement such framework in a distributed way without synchronization is unknown.

A distributed priority scheduling technique that normally piggybacks the priority tag of a node's head-of-line packet onto the handshake (RTS/CTS) frames and data frame has been proposed by V. Kanodia, C. Li, A. Sabharwal, B. Sadeghi, E. Knightly: "Distributed Multi-Hop Scheduling and Medium Access with Delay and Throughput Constraints", ACM SIGMOBILE, 2001, pp.200-209. Each node locally usually constructs a scheduling table based on overhead information, and commonly incorporates its estimate of its relative priority into the Medium Access Control (MAC). The scheme is typically further enhanced by receiver participation and/or stale entry elimination, as described by V. Kanodia, C. Li, A. Sabharwal, B. Sadeghi, E. Knightly: "Ordered Packet Scheduling in Wireless Ad Hoc Networks: Mechanisms and Performance Analysis", MOBIHOC'02, June 2002.

Accordingly, the above generally emphasizes why the performance of TCP over ad hoc network has usually been the research focus recently. Specifically, since a node in MANET is likely in motion, the communication links between nodes will likely be broken frequently, which often leads to mass packet losses and/or usually degrades TCP performance greatly. As described above, a general feedback-based scheme for improving the TCP performance in ad hoc wireless network has been proposed by K. Chandran, S. Raghunathan, et al.: "A Feedback-Based Scheme for Improving TCP Performance in Ad Hoc Wireless Networks", IEEE Personal Comm., Feb. 2001, pp.34-39. The TCP source typically enters a snooze state after it receives a router failure notification packet and normally freezes its sending window at least until it receives the route reestablishment notification packet.

Another proposal, according to F. Wang, Y. Zhang: "Improving TCP Performance over Mobile Ad-Hoc Networks with Out-of-Order Detection and Response", MOBIHOC'02, June 2002, is to make TCP adapt to frequent route changes, usually by detecting and/or responding to out-of-order packet delivery at the TCP layer. In fact, most of the work deals with the link failure and route change problems typically caused by node mobility.

However, recently studies according to S. Xu, T. Saadawi, "Does the IEEE 802.11 MAC Protocol Work Well in Multihop Wireless Ad hoc Network", IEEE Commun. Mag., June 2001, shows that the performance and fairness of the Medium Control Access (MAC) protocol in ad hoc network normally affects the network layer (routing) and/or transport layer greatly. A conclusion of this document is that the current WLAN IEEE 802.11 DCF does not typically function well in a multihop ad hoc network.

However, as is described below with respect to FIGS. 1(a) and 1(b), all the Medium Access Control (MAC) protocols mentioned above tend to have the same problem.

Namely, the fairness problem was first pointed out by V. Bharghavan, A. Demers, S. Shenker, L. Zhang: "MACAW: A Media Access Protocol for Wireless WLAN's", ACM SIGCOMM, 1994. pp.212-225. This problem occurs mainly because of hidden terminal problems, as well as because of the binary exponential backoff (BEB) scheme used in the Medium Access Control (MAC) protocol.

The general scenario will be described with respect to FIG. 1(a) and (b). There are typically two flows in the illustrated configuration, flow 1 is normally from node N1 to node N2, and flow 2 is usually from node N4 to node N3 in case (a) and in the opposite direction in case (b). The carrier sensing range (and interfering range) is commonly supposed to be the same as the communication range according to V. Bharghavan, A. Demers, S. Shenker, L. Zhang: "MACAW: A Media Access Protocol for Wireless WLAN's", ACM SIGCOMM, 1994. pp.212-225, which is typically different from the supposition according to S. Xu, T. Saadawi, "Does the IEEE 802.11 MAC Protocol Work Well in Multihop Wireless Ad hoc Network", IEEE Commun. Mag., June 2001. A larger sensing range and/or interfering ranges will usually degrade the network performance severely. Therefore, a term range is frequently used to refer both the communication range and sensing/interfering range of a node. The range of a node transmitting data is normally covered by a solid line, while the range of a node receiving data is commonly covered by a dashed line. Since the Request-to-Send/Clear-to-Send (RTS/CTS) handshaking mechanism routinely alleviates the hidden terminal problem, it is generally assumed that Request-to-Send/Clear-to-Send (RTS/CTS) is always used, except for a broadcast frame. In addition, it is typically supposed that both flows have enough traffic, in other words, the transmitting node almost always has data to send.

The configuration according to FIG. 1(a) is commonly symmetric, in other words, the competition between flow 1 and flow 2 is normally fair, at least on a large time scale. However, there typically exists an extreme unfairness on the time scale of seconds. It shall generally be supposed that flow 1 reserves the channel successfully by Request-to-Send/Clear-to-Send (RTS/CTS), then node N3 usually cannot reply the RTS from node N4 because it is normally deferred. Node N4 will generally retransmit the RTS frame again and again until it reaches the retransmission limit, which is usually seven for 802.11 DCF. Since flow 1 typically finishes the packet exchange successfully, it will routinely reduce its contention window (CW) to $CW_{min}$, which is normally 31 according to 802.11 DCF. However, the contention window (CW) of node N2 will generally double every time after a failed access, at least until it reaches the retransmission limit and the contention window (CW) will commonly be reset to $CW_{min}$ again. Usually, the only chance that flow 2 can successfully initiate a transfer is when its RTS happens to arrive during those very short gaps in between a completed data transmission and the next RTS from node N1. The opposite scenario may happen where flow 2 seizes the channel and flow 1 cannot get the channel.

The following observations may be obtained in simulations: If the User Datagram Protocol (UDP) is used as the transport layer protocol, in other words, if there is no congestion control and flow control at the transport layer, then flow 1 usually grabs the channel from one to ten seconds (flow 2 generally cannot send any packet in this period) and, after that, flow 2 commonly grabs the channel and flow 1 cannot send any packet. If the Transport Control Protocol TCP is used as the transport layer protocol, then the results are typically different. When one flow grabs the channel, the other flow usually cannot get the channel, and the TCP agent of that node will normally time-out and/or retransmit at the transport layer, typically causing it to be unlikely to grab the channel again. However, which flow will grab the channel and starve the other flow is often somewhat random.

Similar to the issues as analyzed by V. Bharghavan, A. Demers, S. Shenker, L. Zhang: "MACAW: A Media Access Protocol for Wireless WLAN's", ACM SIGCOMM, 1994. pp.212-225, a key problem is usually the lack of synchronizing information. When one flow (for example, flow 1) grabs the channel, the other flow access will normally be successful only in the short period after the transmission of flow 1 and its next access attempt. However, node N4 commonly has no way of knowing whether node N1 is transmitting. According to V. Bharghavan, A. Demers, S. Shenker, L. Zhang: "MACAW: A Media Access Protocol for Wireless WLAN's", ACM SIGCOMM, 1994. pp.212-225, the problem is often solved by having node N3 not contending on behalf of node N4. Node N3 generally uses a "Request for RTS" (RRTS) to trigger the RTS from node N4. Although a RRTS packet normally works well in the configuration according to FIG. 1(a), it generally cannot solve the contention problem according to FIG. 1(b).

By referring to the configuration according to FIG. 1(b), node N2 (the receiver of flow 1) is commonly in the range of node N3 (the sender of flow 2). The simulation results show that flow 2 grabs the channel while flow 1 is typically completely denied access most of the time, especially when TCP is used at the transport layer. A key problem is commonly not only the lack of synchronizing information. Node N1 is usually trying to contend with node N3 during a very short contention period, but node N1 normally has no way of knowing when this period starts or finishes. The RRTS commonly cannot solve the problem in this scenario at least because, most of the time, when node N1 initiates a data transfer by sending a RTS, node N2 cannot hear it, usually due to node N3's transmission. The situation often persists even when nodes N1 and N3 are synchronized well, in other words, node N1 and N3 start competing to access the channel at the same time using the same contention window (CW) counter. Typically, the only chance that node N1 has to access the channel is when node N3 tries to access the channel after the RTS/CTS exchange of flow 1 is finished. Then, node N3 will usually hear the CTS from node N2 and normally stop trying to access the channel.

The same problem often occurs not only for the 802.11 DCF, but also for all the Medium Access Control (MAC) protocols mentioned above. As may be seen from the previous example, the issue generally lies not only in the lacking of synchronization information, but also in the backoff scheme and/or in the contention window (CW) resetting scheme after a successful transfer of a stream.

SUMMARY OF THE INVENTION

Therefore, it is an object of certain embodiments of the present invention to overcome the shortcomings discussed above. Particularly, certain embodiments of the present invention aim at providing a method presenting the synchronization information for competing streams and/or a new backoff scheme for succeeded stations.

According to certain embodiments of the present invention, this object may be solved by providing a method for enhancing the fairness and/or performance in a multihop ad hoc network, the method generally including providing contention synchronization information regarding a transmission between nodes of the network, wherein the information is often provided to nodes in a range of at least two hops from the nodes participating at the transmission; and setting, after successfully finishing the transmission, a waiting time for the nodes participating at the transmission, during which these nodes typically backoff from accessing a transmission medium.

Alternatively, the contention synchronization information may be provided by generating a black burst energy signal by each node receiving a transmission request and/or a transmission clearance, the black burst energy signal typically indicating the busy time of the transmission medium according to a mapping scheme.

According to certain preferred embodiments, the method may be in accordance with the Distributed Coordination Function, as defined by the international standard 802.11 for Wireless Local Area Networks of the IEEE.

In this case, the transmission request is often the Request-to-Send packet, the transmission clearance is usually the Clear-to-Send packet, and the waiting time is normally equal to the time for a Request-to-Send/Clear-to-Send-handshaking, plus the total backoff time of the minimum contention window.

In a preferred embodiment of the present invention, the method includes backing off by a node using a random value uniformly chosen between [0, $CW_{min}$] before accessing a channel, usually when a packet arrives to a Medium Access Control Layer from a higher layer; generating a black burst energy signal according to the mapping scheme, generally when a node receives a Request-to-Send or Clear-to-Send not for itself, wherein the black burst energy signal is typically not sent if the node detects the channel is busy; receiving the black burst energy signal by a first node and normally attempting to access the channel by the first node for limited times before the end point of the time indicated by the black burst energy signal, wherein these attempts are often not added to the retransmission times for the packet; starting a backoff timer at the end point of the time indicated by the black burst energy signal, normally by using a random value uniformly chosen between [0, $CW_{min}$], while the contention window for this node is not reset, if the first node detects the channel is idle, wherein only the earliest time point is used if more than one black burst energy signal is received; and waiting for a time period after a successful transmission, before a sender node and a receiver node access the channel again, wherein the length of the time period usually equals the time for a Request-to-Send/Clear-to-Send-handshaking plus the total backoff time of the minimum contention window.

According to certain embodiments, the end point of the time indicated by the black burst energy signal is calculated according to:

$$T_i = T_{curr} + T_{SIFS} + T_{CTS} + T_{TR} + T_{BB} + T_{DATA},$$

wherein $T_{curr}$ is generally the time when the black burst energy signal is received and $T_{BB}$ is typically the transmission time for the black burst energy signal.

In this case, the end point of the time indicated by the black burst energy signal may coincide with the end of the DATA packet frame, especially if the black burst energy signal was generated due to a Request-to-Send packet, and wherein the end point of the time indicated by the black burst energy signal may be near the finish time of the ACK frame with a difference of turnaround time, plus black burst energy signal transmission time, especially if the black burst energy signal was generated due to a Clear-to-Send packet.

Moreover, according to certain embodiments of the present invention, an object may be solved by providing a system for enhancing the fairness and/or performance in a multihop ad hoc network, the network normally including means for providing contention synchronization information regarding a transmission between nodes of the network, and for providing the information to nodes in a range of at least two hops from the nodes participating at the transmission; means for setting a waiting time for the nodes participating at the transmission after a successful finish of the transmission, in which these nodes generally backoff from accessing a transmission medium.

The system according to certain embodiments of the present invention may be modified in a similar manner as is outlined above with respect to the method according to certain embodiments of the present invention. Particularly, the system according to certain embodiments of the present invention may be adapted to perform the method according to certain embodiments of the present invention, and modifications thereto.

As a further preferred embodiment of the present invention, there may be provided a node according to the international standard 802.11 for Wireless Local Area Networks of the IEEE, wherein the node is usually adapted to back off using a random value uniformly chosen between [0, $CW_{min}$] before accessing a channel, when a packet arrives to a Medium Access Control Layer from a higher layer; the node is generally adapted to generate a black burst energy signal according to the mapping scheme, typically when it receives a Request-to-Send or Clear-to-Send not for itself, wherein the black burst energy signal is usually not sent if the node detects the channel is busy; the node is normally adapted to receive the black burst energy signal and commonly attempts to access the channel for limited times before the end point of the time indicated by the black burst energy signal, wherein these attempts are generally not added to the retransmission times for the packet; the node is typically adapted to start a backoff timer at the end point of the time indicated by the black burst energy signal, often by using a random value uniformly chosen between [0, $CW_{min}$], while the contention window for this node is usually not reset, if the node detects the channel is idle, wherein only the earliest time point is normally used if more than one black burst energy signal is received; and the node is commonly adapted to wait for a time period after a successful transmission, before the channel is accessed again, wherein the length of the time period routinely equals the time for a Request-to-Send/Clear-to-Send-handshaking plus the total backoff time of the minimum contention window.

Also, the node according to certain embodiments of the present invention may be modified in a manner as outlined above and/or so as to perform the method according to certain embodiments of the present invention.

An implementation of the method according to certain embodiments of the present invention may be named BBDCF (Black Burst Distributed Coordination Function). According to the method of certain embodiments of the present invention, the fairness and/or performance of the MAC protocol in multihop ad hoc networks is generally improved. In the BBDCF, the black burst (BB) energy is typically used to signal the data transmission time to all the nodes in two-hop range from the data sender and receiver. Therefore, all possible access attempts that may affect the current transmission are usually synchronized by the BB signal and will normally complete the channel access in a more efficient and/or fair way.

Thus, the fairness and/or performance of the MAC protocol, being one of the currently-considered main issues for transport optimization in wireless packet network, is addressed. This issue often roots in the design of the MAC protocol. One solution to these problems, as according to certain embodiments of the present invention, commonly benefits the performance for transport protocol in WLAN with hidden terminals, the hot spot wireless network with hidden terminals, and/or ad hoc network, where a connection may be relayed by multiple nodes.

According to certain embodiments of the present invention, a system for enhancing fairness and performance in a multihop ad hoc network. The system generally includes a first processor for providing contention synchronization information regarding a transmission between a first set of nodes of the network, and for providing the information to a second set of nodes in a range of two hops from the first set of nodes participating at the transmission. The system also typically includes a second processor for setting a waiting time for the first set of nodes after a successful finish of the transmission, in which the first set of nodes backoff from accessing a transmission medium.

According to certain embodiments of the present invention, a solution to the fairness and/or performance issue in multihop ad hoc networks is presented. Since there is currently no known other solution that is designed for a distributed network, such as, for example, a mobile ad hoc network, this is an important progression for the field of certain embodiments of the present invention.

It is a further advantage of certain embodiments of the present invention that the BBDCF is based on IEEE 802.11 DCF, in other words, it includes a modification of the IEEE 802.11 DCF, wherein the implementation cost is typically low and no control or management frame will usually be introduced.

BRIEF DESCRIPTION OF THE DRAWINGS

Further details and/or advantages of embodiments of the present invention will become more readily apparent from the following detailed description of certain preferred embodiments of the present invention, which is to be taken in conjunction with the appended drawings, in which.

DETAILED DESCRIPTION OF THE PREFERRED EMBODIMENT(S)

In the following, a preferred embodiment of the present invention is described in detail by making reference to the drawings.

Specifically, the preferred embodiment of the present invention described is an example of an implementation of an algorithm. In detail, the implementation shall be referred to as the Black Burst Distributed Coordination Function, which commonly provides synchronization information for competing streams. Generally involved in such competing streams are stations which are typically hidden from each other, in other words, they are not in each other's range. Hence, the competition between hidden terminals is usually referred to as hidden competition here. The hidden competition scenario may be illustrated according to FIG. 2.

Figure 2:
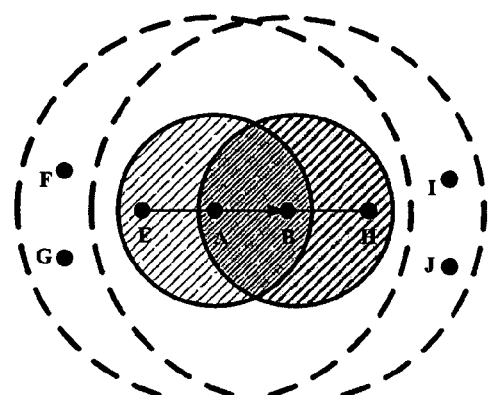
FIG. 2 shows a hidden competition in multihop scenario as underlying certain embodiments of the present invention.

When station A is trying to communicate with station B, node H normally acts as a hidden terminal for node A. On the other hand, node E commonly acts as an exposed terminal. In FIG. 2, the respective range of source station A and destination station B is shown by corresponding solid circles, while the respective two-hop range of stations A and B is shown by dashed circles. Here, the two-hop range generally means the stations in this range may typically be reached by no more than two hops. Those stations in the solid circle range covered by the hatched area are usually supposed to be able to use a Network Allocation Vector (NAV) to perform a virtual carrier sense at the Medium Access Control (MAC) layer, especially if the Request-to-Send/Clear-to-Send (RTS/CTS) exchange of nodes A and B is carried out successfully. However, the situation observed by nodes in two-hop range but out of the one-hop range is normally different.

Figure 1:
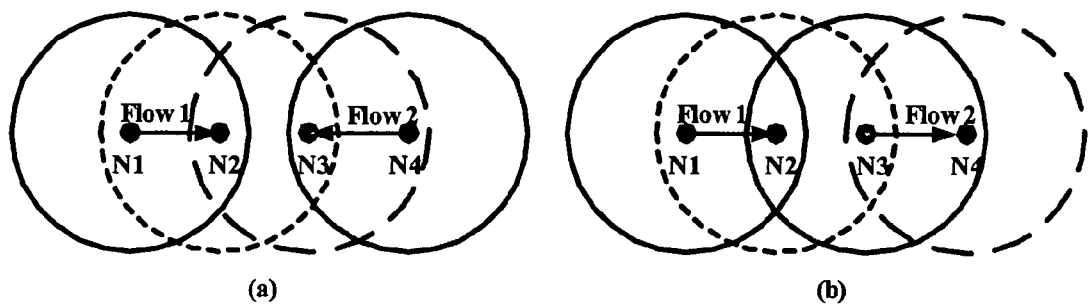
FIG. 1 shows a two-stream configuration according to the related art.

Normally, it may be presumed that node A is sending a data frame to node B after the Request-to-Send/Clear-to-Send (RTS/CTS) exchange. Node F will commonly observe whether the carrier is clear and may try to access the channel and/or send an RTS frame to node E. Node E typically cannot receive any frame correctly, because node A is also usually transmitting, which is the situation underlying FIG. 1(b). However, if node F is trying to communicate with another node G, then it will normally not be affected by the transmission from node A to node B. Since every node in a wireless multihop ad hoc network is generally supposed to be self-organized and is typically moving, the exact physical location information is often difficult to obtain. Besides, even if the node could obtain such information, it also usually needs to know whether a transmission occurring within a two-hop range will affect the current access.

Therefore, a problem commonly lies in the lack of information of transmission from nodes within the two-hop range.

Figure 3:
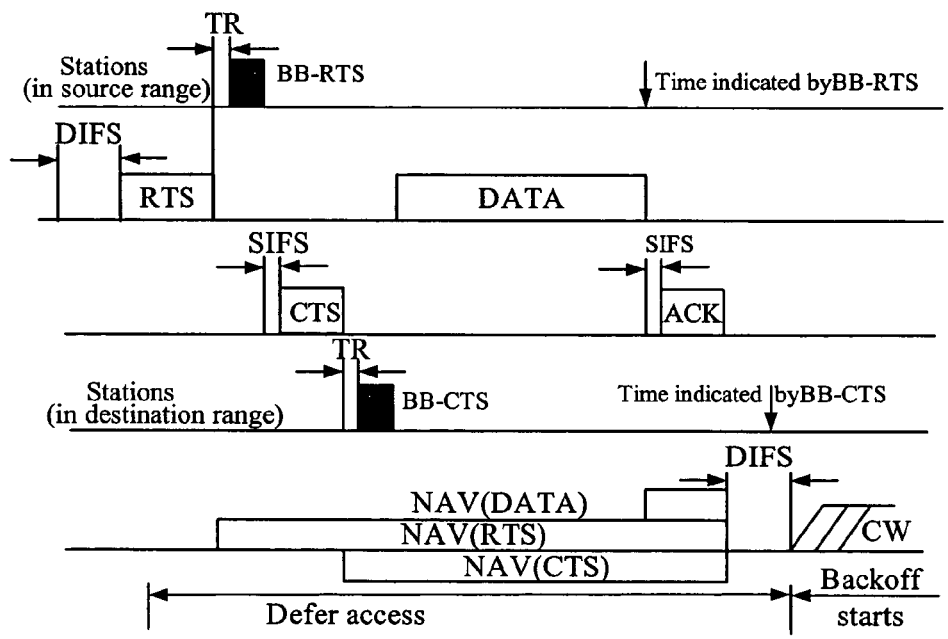
FIG. 3 shows the Black Burst Distributed Coordination Function (BBDCF) access method according to certain embodiments of the present invention with Request-to-Send/Clear-to-Send (RTS/CTS) exchange.

According to certain embodiments of the present invention, the Black Burst Distributed Coordination Function (BBDCF) protocol may be presented to provide information to stations in the two-hop range, which is shown in FIG. 3.

The Black Burst (BB) signal is commonly a pure energy signal and generally contains no decodable information. It is typically assumed in this discussion that the station receiving the BB signal is usually able to sense that the channel is busy and can normally tell how long the busy time is. As shown in FIG. 3, the BB energy signal is routinely transmitted when a station hears an RTS frame (stations in source range) or a CTS frame (stations in destination range) not for itself. According to certain embodiments of the present invention, the BB energy signal has two functions:

1) It usually notifies that a transmission has started within a two-hop range. However, at this time, even if a station has received such a BB energy signal, it normally cannot tell whether it could access the channel. For example, even if node F has received a BB signal from node E after node A has transmitted the RTS frame, it generally cannot tell whether it could start the access. This is typically because, if the access is to node G, then it will usually succeed, and if the access is to node E, then it will normally fail. Therefore, after receiving the BB signal, a station will commonly have to try the access for limited times, but such attempts should generally not be counted as the retransmission number of the packet at the Medium Access Control (MAC) layer.

2) From the received BB energy signal, the stations may deduce the time when the transmission two hops away will be over. The reason is generally that the packet length is typically distributed densely around some discrete points such as, for example, 40, 552 and 576 bytes. Therefore, a mapping scheme between the data packet length and BB signal length may be defined. That is, from the length of the BB energy signal, the station may be able to predict the length of the data packet in transmission. It shall be noted that, especially when a station receives a BB energy signal, it usually cannot tell whether it is a BB-RTS or BB-CTS (see FIG. 3). That is, the time point indicated by the BB-RTS, which is normally generated from the nodes hearing RTS, and BB-CTS, which is commonly generated from the nodes hearing CTS, is often different. This difference is generally designed to provide fairness.

The time indicated by the BB energy signal is often calculated as follows:

$$T_i = T_{curr} + T_{SIFS} + T_{CTS} + T_{TR} + T_{BB} + T_{DATA},$$

where $T_i$ is the indication time, $T_{curr}$ is the time when the BB energy signal is received, and $T_{BB}$ is the transmission time for the BB energy signal. Others are typically set according to the 802.11 standard.

Therefore, the time point indicated by BB-RTS is usually just the time when the DATA frame has been transmitted.

By referring back to FIG. 1(b), why the time point after the ACK frame is not indicated is explained in detail. According to certain embodiments, after flow 2 reserves the channel and transmits its DATA frame, the range of node N2 is generally clear. Then, from this time, node N1 may typically access the channel by sending its RTS frame to node N2 and will usually not affect or be affected by the transmission of flow 2, at least because the length of the RTS frame is normally larger than that of the CTS frame.

On the contrary, supposing that the time point after the ACK frame is used to notify node N1 to start its competition, then node N1 will likely be affected by the next transmission attempt from node N3, as described above, in the introductory portion, which is generally caused by the unfair competition between nodes N1 and N3.

On the other hand, the time indicated by BB-CTS is usually near the finish time of the ACK frame, typically with a difference of the turnaround time, plus the BB transmission time. This setting should become easy to understand when considering the situation according to FIG. 1(a). The competition of node N1 and node N4 is normally fair and should routinely start from the same point in time.

The BB energy signal length is commonly much smaller than that of the RTS, CTS or DATA frame. For example, in a Dynamic Congestion Control Scheme of the physical layer, if the physical bandwidth is 2Mbps, the transmission time for RTS and CTS are 352 μs and 304 μs, respectively, while a present simulation reveals that the BB energy signal used is commonly from 10 μs to 50 μs. Therefore, the difference between collisions of control packet frames and/or data packet frames and BB energy signals can usually easily be calculated.

In the following, methods and systems according to certain embodiments of the present invention are described in detail.

When a packet arrives at the Medium Access Control (MAC) layer from a high layer, even if the channel is idle, then the node generally starts a backoff using a random value uniformly chosen between [0, $CW_{min}$] before accessing the channel.

If a station receives a RTS or CTS not for itself, then it typically generates a BB energy signal according to a mapping scheme, usually defined beforehand. If the node detects that the channel is busy (including by a Network Allocation Vector—NAV), then it normally cannot send the BB energy signal. Otherwise, the BB may affect the ongoing transmission. It is noted that the Network Allocation Vector (NAV) setting by RTS or CTS should not normally restrict their corresponding BB energy signal since, otherwise, no BB energy signal could generally be sent at all.

A station receiving a BB energy signal will typically attempt to access the channel for limited times before the time point indicated by the BB energy signal. These attempts will usually not be added to the retransmission times for the packet, which is often used to determine whether the packet should be dropped.

At the time point indicated by the BB energy signal, if the node detects that the channel is idle, it should usually start a backoff timer using a random value uniformly chosen between [0, $CW_{min}$], while the contention window (CW) for this node will typically not be reset.

If more than one BB energy signal is received, then only the earliest time point will usually be used.

After a successful transmission, both the sender node and the receiver node should typically wait for a time period before accessing the channel again. The length of this time period often equals the time for an Request-to-Send/Clear-to-Send (RTS/CTS) handshaking, plus the total backoff time of $CW_{min}$.

It is further noted that the waiting time in force may degrade the performance in the scenario of a Wireless Local Area Network (WLAN), especially where there is only one hop and no hidden competition at all. However, the point is that a WLAN protocol that is designed for a one hop scenario generally works poorly in a multihop scenario, and vice versa.

The above implementation is generally based on the implementation of IEEE 802.11 DCF, since certain preferred embodiments of the present invention rely on the RTS/CTS/DATA/ACK handshaking and the CSMA/CA of 802.11 DCF.

For the implementation, the physical wireless network card and card driver may be advantageously used.

Since certain preferred embodiments of the present invention refer to the IEEE 802.11 standards, at least these embodiments may be regarded as including a performance enhancement scheme for IEEE 802.11 standards in a multihop wireless network.

What is described above included a method for enhancing the fairness and/or performance in a multihop ad hoc network, often including providing contention synchronization information regarding a transmission between nodes of the network, wherein the information is commonly provided to nodes in a range of two hops from the nodes participating at the transmission; and setting, usually after successfully finishing the transmission, a waiting time for the nodes participating at the transmission, in which these nodes backoff from accessing a transmission medium.

While what has been described above is generally presently considered to be at least some of the preferred embodiments of the present invention, it is to be understood that these embodiments are presented by way of example only and that various modifications may be made without departing from the scope of the embodiments of the present invention recited in the appended claims.

We claim:

1. A method for enhancing fairness and performance in a multihop ad hoc network, the method comprising:

providing contention synchronization information regarding a transmission between a first set of nodes of the network, wherein the information is provided to a second set of nodes in a range of two hops from the first set of nodes participating at the transmission; and setting, after successfully finishing the transmission, a waiting time for the first set of nodes, in which the first set of nodes backoff from accessing a transmission medium, wherein, the providing of the contention synchronization information provides the contention synchronization information by generating a first black burst energy signal by each node in a third set of nodes of the network receiving a transmission request or a transmission clearance, the first black burst energy signal indicating a busy time of the transmission medium according to a mapping scheme, wherein in the providing of the contention synchronization information, the method accords to a distributed coordination function, and wherein in the providing of the contention synchronization information, the transmission request comprises a request-to-send packet, the transmission clearance comprises a first clear-to-send packet, and the waiting time comprises a time for a request-to-send/clear-to-send-handshaking and a total backoff time of a minimum contention window.

2. The method according to claim 1, further comprising:

backing off by a first node using a random value uniformly chosen between 0 and $CW_{min}$ before accessing a channel, when a first packet arrives to a medium access control layer from a higher layer;

generating a second black burst energy signal according to the mapping scheme, when a second node receives a request-to-send or clear-to-send not for itself, wherein the second black burst energy signal is not sent if the second node detects the channel is busy;

receiving the second black burst energy signal by a third node and attempting to access the channel by the third node for limited times before an end point of the time indicated by the second black burst energy signal, wherein these attempts are not added to retransmission times for the first packet;

starting a backoff timer at the end point of the time indicated by the second black burst energy signal by using a random value uniformly chosen between 0 and $CW_{min}$, while a first contention window for the third node is not reset, if the third node detects the channel is idle;

wherein only an earliest time point is used if more than one black burst energy signal is received; and waiting for a time period after a successful transmission, before a sender node and a receiver node access the channel again, wherein length of the time period comprises the time for the request-to-send/clear-to-send-handshaking and the total backoff time of the minimum contention window.

3. The method according to claim 2, wherein, in the receiving of the second black burst energy signal, the end point of the time indicated by the second black burst energy signal is calculated according to:

$$T_i = T_{curr} + T_{SIFS} + T_{CTS} + T_{TR} + T_{BB} + T_{DATA},$$

wherein $T_{curr}$ is a time when the second black burst energy signal is received and $T_{BB}$ is a transmission time for the second black burst energy signal.

4. The method according to claim 2, wherein, in the receiving of the second black burst energy signal, the end point of the time indicated by the second black burst energy signal coincides with an end of a data packet frame, if the second black burst energy signal was generated due to a second request-to-send packet, and wherein the end point of the time indicated by the second black burst energy signal is near a finish time of an ack frame with a difference of turnaround time plus second black burst energy signal transmission time, if the second black burst energy signal was generated due to a second clear-to-send packet.

5. A system to enhance fairness and performance in a multihop ad hoc network, the system comprising:

a first processor configured to provide contention synchronization information regarding a transmission between a first set of nodes of the network, and configured to provide the information to a second set of nodes in a range of two hops from the first set of nodes participating at the transmission;

a second processor configured to set a waiting time for the first set of nodes after a successful finish of the transmission, in which the first set of nodes backoff from accessing a transmission medium;

a first node configured to receive a transmission request or a transmission clearance, and configured to generate a black burst energy signal by each such receipt, the black burst energy signal indicating a busy time of the transmission medium according to a mapping scheme to provide the contention synchronization information; and a wireless local area network, wherein, in the first node, the transmission request comprises a request-to-send packet, the transmission clearance comprises a clear-to-send packet, and the waiting time comprises a time for a request-to-send/clear-to-send-handshaking and a total backoff time of a minimum contention window.

6. The system according to claim 5, further comprising:

a second node, a sender node, and a receiver node, wherein the sender node is configured to back off using a random value uniformly chosen between 0 and $CW_{min}$ before accessing a channel, when a packet arrives to a medium access control layer from a higher layer;

the second node is configured to generate a black burst energy signal according to the mapping scheme, when the second node receives a request-to-send or clear-to-send not for itself, wherein the black burst energy signal is not sent if the second node detects the channel is busy;

the second node is configured to receive the black burst energy signal and attempt to access the channel for limited times before an end point of a time indicated by the black burst energy signal, wherein these attempts are not added to retransmission times for the packet;

the second node is configured to start a backoff timer at the end point of the time indicated by the black burst energy signal by using a random value uniformly chosen between 0 and $CW_{min}$, while a contention window for the second node is not reset, if the second node detects the channel is idle, wherein only an earliest time point is used if more than one black burst energy signal is received; and the sender node and the receiver node are configured to wait for a time period after a successful transmission, before the channel is accessed again, wherein length of the time period comprises the time for the request-to-send/clear-to-send-handshaking and the total backoff time of the minimum contention window.

7. The system according to claim 6, wherein, in the second node, the end point of the time indicated by the black burst energy signal is calculated by the first set of nodes according to:

$$T_i = T_{curr} + T_{SIFS} + T_{CTS} + T_{TR} + T_{BB} + T_{DATA},$$

wherein $T_{curr}$ is a time when the black burst energy signal is received and $T_{BB}$ is a transmission time for the black burst energy signal.

8. The system according to claim 6, wherein, in the second node, the end point of the time indicated by the black burst energy signal coincides with an end of a data packet frame, if the black burst energy signal was generated by a third node due to a request-to-send packet, and wherein the end point of the time indicated by the black burst energy signal is near a finish time of an ack frame with a difference comprising turnaround time and black burst energy signal transmission time, if the black burst energy signal was generated by a fourth node due to a clear-to-send packet.

9. A wireless local area network node, wherein:

the node is configured to back off using a random value uniformly chosen between 0 and $CW_{min}$ before accessing a channel, when a packet arrives to a Medium Access Control Layer from a higher layer;

the node is configured to generate a black burst energy signal according to a mapping scheme, when the node receives a request-to-send or clear-to-send not for itself, wherein the black burst energy signal is not sent if the node detects the channel is busy;

the node is configured to receive the black burst energy signal and attempts to access the channel for limited times before an end point of a time indicated by the black burst energy signal, wherein these attempts are not added to retransmission times for the packet;

the node is configured to start a backoff timer at the end point of the time indicated by the black burst energy signal by using a random value uniformly chosen between 0 and $CW_{min}$, while a contention window for the node is not reset, if the node detects the channel is idle, wherein only an earliest time point is used if more than one black burst energy signal is received; and the node is configured to wait for a time period after a successful transmission, before the channel is accessed again, wherein length of the time period comprises a time for a request-to-send/clear-to-send-handshaking and a total backoff time of a minimum contention window.

10. The node of claim 9, wherein the node is in accordance with standard 802.11 for wireless local area networks of the IEEE.

11. The node according to claim 9, wherein, in the node, the end point of the time indicated by the black burst energy signal is calculated by the node according to:

$$T_i = T_{curr} + T_{SIFS} + T_{CTS} + T_{TR} + T_{BB} + T_{DATA},$$

wherein $T_{curr}$ is a time when the black burst energy signal is received and $T_{BB}$ is a transmission time for the black burst energy signal.

12. The node according to claim 9, wherein, in the node, the end point of the time indicated by the black burst energy signal coincides with an end of a data packet frame, if the black burst energy signal was generated by the node due to a request-to-send packet, and wherein the end point of the time indicated by the black burst energy signal is near a finish time of an ack frame with a difference comprising turnaround time and black burst energy signal transmission time, if the black burst energy signal was generated by the node due to a clear-to-send packet.

* * * * *